United States Patent
Li

(10) Patent No.: US 10,515,271 B2
(45) Date of Patent: Dec. 24, 2019

(54) FLIGHT DEVICE AND FLIGHT CONTROL METHOD

(71) Applicant: AUTEL ROBOTICS CO., LTD., Shenzhen, Guangdong (CN)

(72) Inventor: Zuoguang Li, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 245 days.

(21) Appl. No.: 15/630,613

(22) Filed: Jun. 22, 2017

(65) Prior Publication Data

US 2017/0293796 A1 Oct. 12, 2017

Related U.S. Application Data

(63) Continuation of application No. PCT/CN2016/070162, filed on Jan. 5, 2016.

(30) Foreign Application Priority Data

Nov. 13, 2015 (CN) .......................... 2015 1 0776453

(51) Int. Cl.
*G06K 9/00* (2006.01)
*G06T 7/246* (2017.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC . G06T 2207/10016; G06T 2207/10028; G06T 2207/30252; G06T 2207/30244;
(Continued)

(56) References Cited

U.S. PATENT DOCUMENTS 8,581,981 B2 11/2013 Alley et al.
8,942,964 B2 1/2015 McWilliams, III et al.
(Continued)

FOREIGN PATENT DOCUMENTS

| CN | 102426019 A | 4/2012 |
|---|---|---|
| CN | 102788580 A | 11/2012 |

(Continued)

OTHER PUBLICATIONS

International Search Report dated Mar. 24, 2016; PCT/CN2016/070162.

*Primary Examiner* — Hung Q Dang

(57) ABSTRACT

A flight device and a flight control method are disclosed. The method includes: acquiring an image and a height of the flight device; determining a scene in which the flight device is currently located; calculating an image X-offset and an image Y-offset of a second image frame of two adjacent image frames relative to a first image frame of the two adjacent image frames; compensating for the image X-offset and the image Y-offset according to the acceleration and the angular velocity of the flight device to obtain image correction offsets comprising a corrected image X-offset and a corrected image Y-offset; calculating an X-offset and a Y-offset in world coordinates corresponding to the image correction offsets; and deriving a velocity of the flight device.

8 Claims, 3 Drawing Sheets

(51) Int. Cl.
  *G06K 9/62* (2006.01)
  *G06T 5/40* (2006.01)
  *B64D 47/08* (2006.01)
  *B64C 39/02* (2006.01)
  *G01C 21/10* (2006.01)

(52) U.S. Cl.
  CPC ........... *G01C 21/10* (2013.01); *G06K 9/6202* (2013.01); *G06K 9/6212* (2013.01); *G06T 5/40* (2013.01); *G06T 7/246* (2017.01); *B64C 2201/127* (2013.01); *G06T 2207/10032* (2013.01)

(58) Field of Classification Search
  CPC . G06T 2207/10032; G06T 2207/30212; G06T 2207/30196; G06T 7/0002; G06T 2207/30168; G06T 2207/20021; G06T 7/0004; H04N 5/23258; H04N 5/23238; H04N 5/23254; H04N 5/23267; H04N 5/247; H04N 5/23229; H04N 5/2328; H04N 1/506; H04N 7/18; G01C 25/00; G01C 21/16; G01C 25/005; G06K 9/00791; G01S 11/12
  See application file for complete search history.

(56) References Cited

U.S. PATENT DOCUMENTS

| | | | |
|---|---|---|---|
| 9,057,609 | B2 | 6/2015 | Yu et al. |
| 2010/0250022 | A1 | 9/2010 | Hines et al. |
| 2011/0311099 | A1* | 12/2011 | Derbanne ............... G06T 7/207 382/103 |
| 2015/0134143 | A1 | 5/2015 | Willenborg |
| 2015/0298822 | A1* | 10/2015 | Eline ..................... B64C 39/024 244/75.1 |

FOREIGN PATENT DOCUMENTS

| | | |
|---|---|---|
| CN | 104062977 A | 9/2014 |
| CN | 104729506 A | 6/2015 |
| WO | 2010/108301 A1 | 9/2010 |

\* cited by examiner

US 10,515,271 B2

FLIGHT DEVICE AND FLIGHT CONTROL METHOD

CROSS-REFERENCE

This application is a continuation application of International Application No. PCT/CN2016/070162, filed Jan. 5, 2016, which claims priority of Chinese Patent Application No. 201510776453.8, filed Nov. 13, 2015, which is incorporated herein by reference in its entirety.

TECHNICAL FIELD

The present disclosure relates to a method, and more particularly, relates to a flight device and a flight control method.

BACKGROUND

Currently, flight devices like Unmanned Aerial Vehicles (UAV), due to the convenience and security thereof, have been widely used in fields such as agricultural production, geological survey, meteorological monitoring, power line inspection, rescue and relief aid, video shooting, map plotting and etc. In the control of the Unmanned Aerial Vehicle, the velocity detection and/or positioning control of the Unmanned Aerial Vehicle is/are key technology. Currently, the velocity detection and/or the positioning control of the Unmanned Aerial Vehicle are mostly done via the positioning realized by the global positioning system (GPS). In addition, currently the velocity detection and/or the positioning control of the Unmanned Aerial Vehicle are mostly performed by an algorithm based on a general scene.

SUMMARY

An embodiment of the present disclosure provides a flight device. The flight device includes a processor and a memory communicably connected with the processor. The memory stores instructions. wherein when execution of the instructions by the processor causes the processor to:

acquire an image captured by a camera module of the flight device;

acquire a height of the flight device sensed by a distance sensor of the flight device;

determine a scene in which the flight device is currently located;

according to two adjacent image frames captured by the camera module and the scene in which the flight device is currently located, calculate an image X-offset and an image Y-offset of a second image frame of the two adjacent image frames relative to a first image frame of the two adjacent image frames;

acquire acceleration and angular velocity of the flight device in three dimensions that are detected by an acceleration sensor of the flight device;

compensate for the image X-offset and the image Y-offset according to the acceleration and the angular velocity of the flight device to obtain image correction offsets including a corrected image X-offset and a corrected image Y-offset;

calculate an X-offset and a Y-offset in world coordinates corresponding to the image correction offsets according to a lens focal length of the camera module, a height of the flight device and the image correction offsets; and derive a velocity of the flight device according to a time interval between time points at which the two adjacent image frames are captured and according to the X-offset and the Y-offset in world coordinates.

Another embodiment of the present disclosure provides a flight control method for controlling a flight device. The flight control method includes:

acquiring an image captured by a camera module of the flight device;

acquiring a height of the flight device sensed by a distance sensor of the flight device;

determining a scene in which the flight device is currently located;

calculating, according to two adjacent image frames captured by the camera module and the scene in which the flight device is currently located, an image X-offset and an image Y-offset of a second image frame of the two adjacent image frames relative to a first image frame of the two adjacent image frames;

acquiring an acceleration and an angular velocity of the flight device in three dimensions that are detected by an acceleration sensor of the flight device;

compensating for the image X-offset and the image Y-offset according to the acceleration and the angular velocity of the flight device to obtain image correction offsets including a corrected image X-offset and a corrected image Y-offset;

calculating an X-offset and a Y-offset in world coordinates corresponding to the image correction offsets according to a lens focal length of the camera module, a height of the flight device and the image correction offsets; and deriving a velocity of the flight device according to a time interval between time points at which the two adjacent image frames are captured and according to the X-offset and the Y-offset in world coordinates.

Still another embodiment of the present disclosure provides a non-volatile computer storage medium. The non-transitory computer-readable storage medium stores computer executable instructions, wherein when the computer executable instructions are executed by a processor, causes the processor to:

acquire an image captured by a camera module of the flight device;

acquire a height of the flight device sensed by a distance sensor of the flight device;

determine a scene in which the flight device is currently located;

according to two adjacent image frames captured by the camera module and the scene in which the flight device is currently located, calculate an image X-offset and an image Y-offset of a second image frame of the two adjacent image frames relative to a first image frame of the two adjacent image frames;

acquire acceleration and angular velocity of the flight device in three dimensions that are detected by an acceleration sensor of the flight device;

compensate for the image X-offset and the image Y-offset according to the acceleration and the angular velocity of the flight device to obtain image correction offsets including a corrected image X-offset and a corrected image Y-offset;

calculate an X-offset and a Y-offset in world coordinates corresponding to the image correction offsets according to a lens focal length of the camera module, a height of the flight device and the image correction offsets; and derive a velocity of the flight device according to a time interval between time points at which the two adjacent image frames are captured and according to the X-offset and the Y-offset in world coordinates.

BRIEF DESCRIPTION OF THE DRAWINGS

One or more embodiments are illustrated by way of example, and not by limitation, in the figures of the accom

REFERENCES

Figure 1:
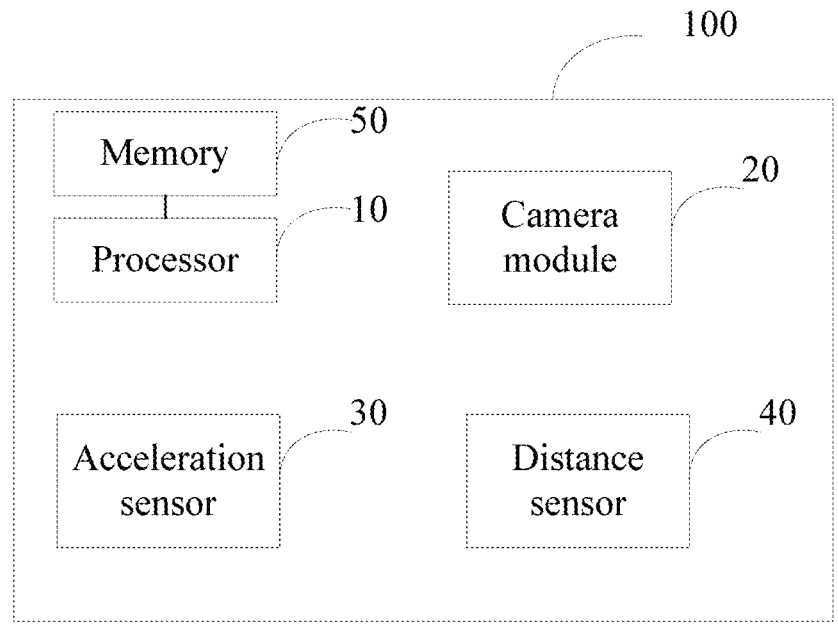
- FIG. 1 is a schematic diagram of hardware architecture of a flight device according to an embodiment of the present disclosure.

Flight device 100
Processor 10
Camera module 20
Acceleration sensor 30
Distance sensor 40
Flight control system S1
Acquisition module 11
Scene determination module 12
Image offset determination module 13
Offset calibration module 14
Velocity calculation module 15
Running controlling module 16
Lens 21
Image sensor 22
Image P1, P2
Object A
Imaging point A1
Lens focal length f
Height H
Corrected image X-offset x1
Corrected image Y-offset y1
X-offset in world coordinates X1
Y-offset in world coordinates Y1
Step 501-511

DETAILED DESCRIPTION

To make the objective, technical solutions and advantages of the present disclosure clearer, the present disclosure will be further detailed with reference to embodiments thereof and the attached drawings. It shall be appreciated that, the specific embodiments described herein are only used to explain the present disclosure rather than to limit the present disclosure.

Referring to FIG. 1, there is shown a schematic diagram of hardware architecture of a flight device 100 according to an embodiment of the present disclosure. The flight device 100 includes a processor 10, a camera module 20, an acceleration sensor 30 and a distance sensor 40.

The camera module 20 is configured to capture an image at every preset time interval, e.g., an image is captured every two seconds. The camera module 20 maybe a monocular or a binocular camera and the images it captures are low resolution images. The acceleration sensor 30 is configured to detect acceleration and angular velocity in three dimensions (X, Y, and Z) of the flight device 100. The distance sensor 40 is configured to detect a distance from the flight device 100 to the ground, i.e., the height of the flight device 100. In an embodiment, the acceleration sensor 30 may be a gyroscope, and the distance sensor 40 may be an ultrasound sensor.

Figure 2:
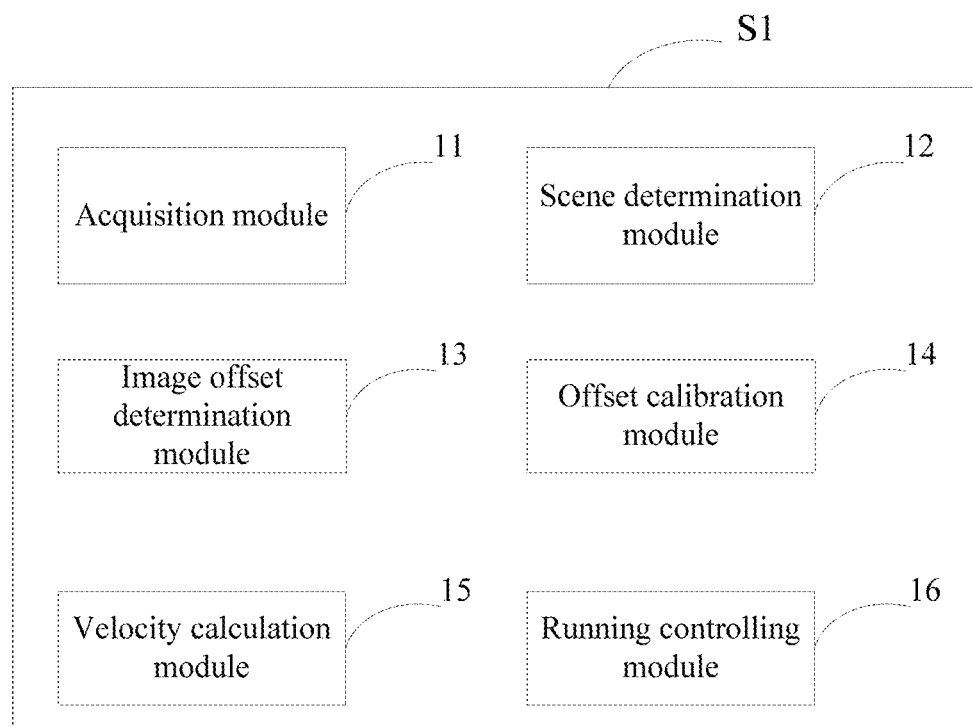
FIG. 2 is a module diagram illustrating a flight control system according to an embodiment of the present disclosure.

Also referring to FIG. 2, the processor 10 runs a flight control system S1. As shown in FIG. 2, the flight control system S1 includes an acquisition module 11, a scene determination module 12, an image offset determination module 13, an offset calibration module 14, a velocity calculation module 15 and a running controlling module 16. The flight control system S1 is configured to detect the velocity of the flight device 100 and perform positioning control. Wherein, each module of the flight control system S1 may be a programmed instruction module, which could be called and executed by the processor 10. Each module of the flight control system S1 may also be the firmware embedded in the processor 10. In an application, the flight control system S1 may be an application software stored in a memory 50 of the flight device 100.

The acquisition module 11 is configured to acquire the image(s) captured by the camera module 20 and acquire a height of the flight device 100 sensed by a distance sensor 40 of the flight device 100. In this embodiment, the acquisition module 11 acquires the image captured by the camera module 20 and acquires the height of the flight device 100 sensed by the distance sensor 40 in real time.

The scene determination module 12 is configured to determine a scene in which the flight device 100 is currently located. Wherein the scene determination module 12 determines the scene in which the flight device 100 is located according to the features in the image. The detailed processes will be described as follows.

The image offset determination module 13 is configured to calculate an image X-offset and an image Y-offset of a second image frame of the two adjacent image frames relative to a first image frame of the two adjacent image frames, according to two adjacent image frames captured by the camera module 20 which is acquired by the acquisition module 11 and the scene in which the flight device 100 is currently located as determined by the scene determination module 12. In an embodiment, the image offset determination module 13 analyzes changes in the parameters of the two adjacent image frames according to the algorithm corresponding to the scene in which the flight device 100 is located, so as to calculate the image X-offset and the image Y-offset of the second image frame of the two adjacent image frames relative to a first image frame of the two adjacent image frames. In other embodiments, the image offset determination module 13 can determine a same feature point in the two adjacent image frames, and calculate a X-offset and a Y-offset of the same feature point in the two adjacent image frames, so as to obtain the image X-offset and the image Y-offset. Wherein, the same feature point is the imaging point of a same object in the two adjacent image frames, and the image X-offset and the image Y-offset are the offsets of the same object in the X direction and in the Y direction of the imaging point in the two image frames.

The offset calibration module 14 is configured to acquire an acceleration and an angular velocity of the flight device 100 in three dimensions that are detected by the acceleration sensor 30, and compensate for the image X-offset and the image Y-offset according to the acceleration and the angular velocity of the flight device 100 so as to obtain image correction offsets.

The velocity calculation module 15 is configured to calculate a X-offset and a Y-offset in world coordinates corresponding to the image correction offsets, i.e., the actual X-offset and the actual Y-offset corresponding to the real world, according to a lens focal length, a height of the flight device 100 and the image correction offsets. Wherein, the X and Y in the present disclosure respectively refer to the lateral-axis direction and the longitudinal-axis direction in the plane parallel to the ground in the three-dimensional coordinate system. The X-offset and the Y-offset in world coordinates refer to the moving distances of the flight device 100/camera module 20 in the X direction and the Y direction relative to the ground.

Figure 3:
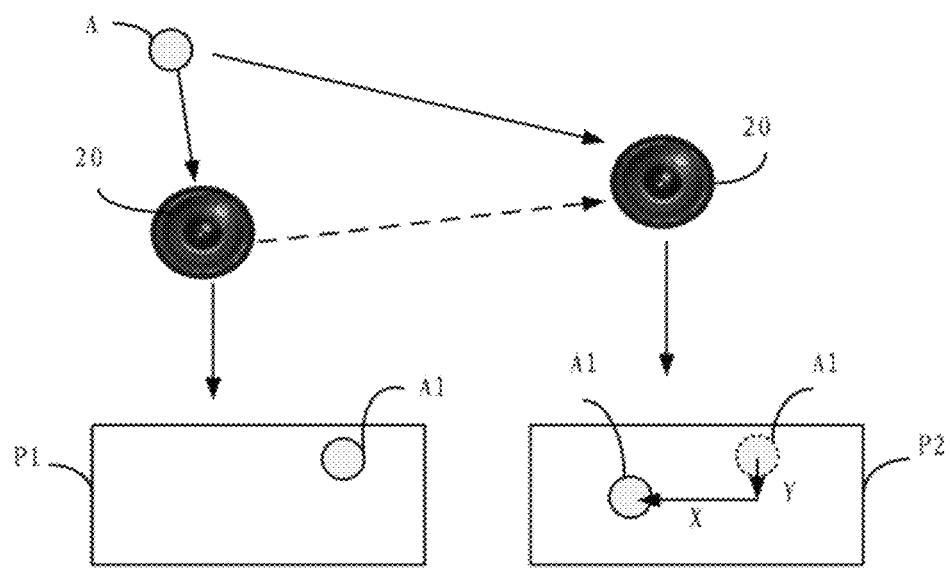
FIG. 3 is a schematic diagram illustrating an X-offset and a Y-offset in world coordinates according to an embodiment of the present disclosure.

Also referring to FIG. 3, there is shown a schematic diagram illustrating the X-offset and the Y-offset in world coordinates. Wherein, since the flight device 100 could move during the time interval between time points at which two adjacent image frames P1 and P2 are captured, for an actual object A, the camera module 20 of the flight device 100 would move relative to this actual object A when the camera module 20 is capturing the images. As shown in FIG. 3, camera module 20 includes a lens 21 and an image sensor 22. When the flight device 100 moves a certain distance towards the upper right direction during the time interval between time points at which the two adjacent image frames P1 and P2 are captured, the actual object A is imaged on the image sensor 22 via the lens 21 of the camera module 20 of the flight device 100. An imaging point A1 of the actual object A in the two adjacent image frames P1 and P2 would offset towards the lower left direction as shown in FIG. 3, and thus an image X-offset and an image Y-offset are formed. Image correction offsets are obtained by compensating and correcting the image X-offset and the image Y-offset. Therefore, there are certain corresponding relationships between the image correction offsets and the X-offset and the Y-offset in world coordinates, and the X-offset and the Y-offset in world coordinates can be obtained according to the image correction offsets or the like. Wherein the camera module 20 may be a camera, a video camera, a webcam or the like. The image correction offsets are the actual distances of the imaging points A1 of the object A in the two adjacent image frames P1 and P2 in the X direction and the Y direction of the image sensor 22.

Figure 4:
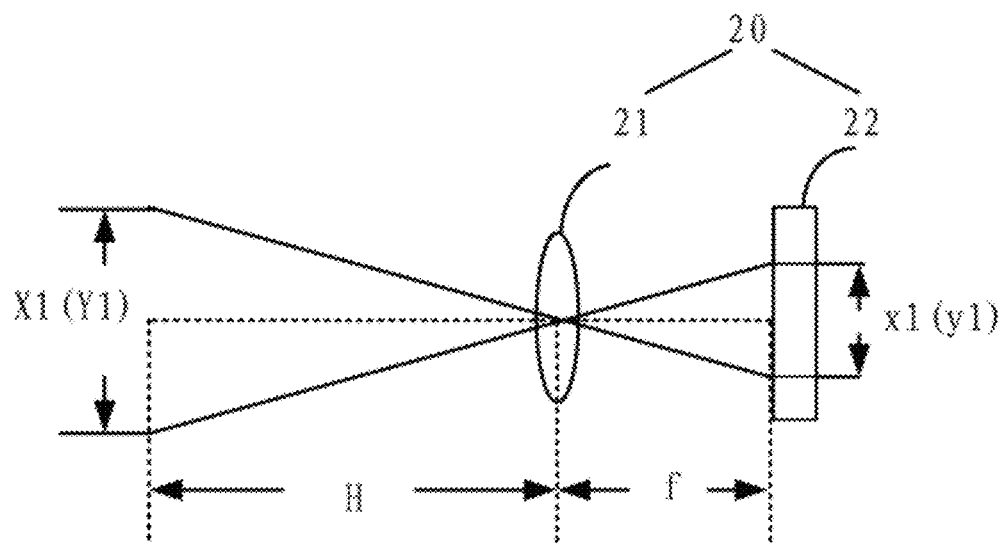
FIG. 4 is a schematic diagram illustrating relationships between the X-offset and the Y-offset in world coordinates and the image correction offsets according to an embodiment of the present disclosure.

Also referring to FIG. 4, there is shown a schematic diagram illustrating relationships between the X-offset and the Y-offset in world coordinates and the image correction offsets. Set the lens focal length be f, the height of the flight device 100 be H, the corrected image X-offset in the image correction offsets be x1, the corrected image Y-offset in the image correction offsets be y1, the X-offset in world coordinates be X1, and the Y-offset in world coordinates be Y1. Obviously, when the camera module 20 is shooting an image downward, the object distance is exactly the height H. As shown in FIG. 4, the ratio of the X-offset or the Y-offset in world coordinates to the corrected image X-offset or the corrected image Y-offset equals to the ratio of the lens focal length f to the height H. That is, the relationships between the X-offset, Y-offset in world coordinates and the image correction offsets satisfy Formula 1: $x1/X1=f/H$ and Formula 2: $y1/Y1=f/H$. Since the focal length f, the height H, the corrected X-offset x1 and the corrected Y-offset y1 in the image correction offsets are all known, the velocity calculation module 15 can calculate the X-offset in world coordinates X1 and the Y-offset in world coordinates Y1 from the lens focal length, the height of the flight device 100 and the image correction offsets according to the aforesaid Formula 1 and Formula 2, respectively.

The velocity calculation module 15 derives a velocity of the flight device 100, according to a time interval t1 between time points at which the two adjacent image frames are captured and the X-offset and the Y-offset in world coordinates. As described above, the X-offset and the Y-offset in coordinates are the moving distances in the X direction and the Y direction of the flight device 100 during the time interval between time points at which the two adjacent image frames are captured. Set the time interval between the time points at which the two adjacent image frames are captured by the camera module 20 be t1. The velocity calculation module 15 calculates the rate of the flight device 100 in the X direction as X1/t1 and the rate of the flight device 100 in the Y direction as Y1/t1 according to the time interval t1 and the X-offset and the Y-offset in world coordinates. In an embodiment, the velocity calculation module 15 first derives the vector sum of the X-offset and the Y-offset in world coordinates to obtain the actual displacement D1 of the flight device 100, and then calculates the actual velocity of the flight device 100 as D1/t1.

The running controlling module 16 is configured to perform positioning and/or hovering control on the flight device 100 at least based on the velocity of the flight device 100. For example, the running controlling module 16 calculates the time required according to the velocity of the flight device 100 and the distance between the flight device 100 and the destination, and makes preparations for the hover or landing when the time required is smaller than a preset value. In an embodiment, if the running controlling module 16 determines that the currently worked out velocity and the velocity worked out last time are equal in magnitude but opposite in directions, it determines that the flight velocity of the flight device 100 is nearly 0 and the moving distance is very small, e.g., 1 cm, and thus controls the flight device 100 to hover at a certain location.

Therefore, in the present disclosure, in absence of the GPS signals, through the captured image, the velocity of the flight device 100 can be calculated and positioning control can be performed.

The flight device 100 is an Unmanned Aerial Vehicle.

Wherein, in some embodiments, the scene determination module 12 determines the scene in which the flight device 100 is currently located according to the image captured by the camera module 20. In other embodiments, based on the scene selected by the user, the scene determination module 12 may also determine the scene selected by the user as the scene in which the flight device 100 is currently located.

Specifically, the scene determination module 12 determines the type of the scene according to at least one parameter in the image captured by the camera module 20.

Wherein, the at least one parameter includes texture. The scene determination module 12 processes the image by use of the sobel gradient algorithm to obtain a gradient matrix. The scene determination module 12 counts the number C of pixels of which the gradient is greater than a threshold T1 in the gradient matrix. It is determined that the scene is relatively richly textured if the value C is greater than the threshold T2, and otherwise, it is determined that the scene is poorly textured.

The at least one parameter further includes reflections. The scene determination module 12 performs reflection statistics according to continuous multi-frame images to determine whether there are reflections so as to determine the scene as a scene with reflections or a scene without reflections. Specifically, when the scene determination module 12 determines that there are dark regions and bright regions in the continuous multi-frame images, or when the scene determination module 12 performs Unmanned Aerial Vehicle light reflection detection to detect according to the shape of the Unmanned Aerial Vehicle light and determines that there is a region conforming with the shape of the Unmanned Aerial Vehicle light, it is determined that the scene is a scene with reflections. Specifically, the scene determination module performs determination according to the reflection detection algorithm. Generally, for more reflective ground, since the circular light of the Unmanned Aerial Vehicle would present a grayscale image in the image which is somewhat bright, the scene determination module 12 determines whether each pixel of the grayscale image is larger than or equal to a threshold T, wherein the threshold T is set on the basis of experience and the threshold T can be set to 220. Moreover, the scene determination module 12 sets the pixel of which the gray value is larger than or equal to T to 255, and sets the pixel of which the gray value is smaller than T to 0, thereby converting the image into a binary image, wherein 0 is the background, and 255 is the foreground. Then extraction of connected regions is performed and the image is represented by an enclosing rectangle. The scene determination module 12 further performs target size determination, and determines the region within a target size range as a light reflection target. Wherein the target size range is obtained according to the measurements of the reflections at different heights.

The at least one parameter further includes grayscale. The scene determination module 12 converts the image into a gray scale histogram according to the gray scale value of the image and performs statistics to compare the brightness of the image with the corresponding threshold, thereby determining whether the scene is dark, normal, or bright. Specifically, the scene determination module 12 sets a threshold T according to the average brightness L of the gray scale histogram, and determines that the scene is a dark scene if L<80 (candela), the scene is a bright scene if L>170, and the scene is a normal scene if 80<L<170.

The at least one parameter may further include lines. The scene determination module 12 performs gradient detection and binary processing on the image. A Then, The scene determination module 12 determines whether there are straight lines by use of the conventional hough straight-line detection. If it is determined that there is at least one straight line and the length of the straight line is at least ½ of the width of the image, the scene is determined as a lined scene.

In an embodiment, the scene determination module 12 determines the type of the current scene based on one of the aforesaid parameters alone and the corresponding algorithm thereof. In other embodiments, the scene determination module may also determine the scene based on several aforesaid parameters together and the corresponding algorithms thereof. For example, the scene determination module 12 may determine whether the current scene is a richly textured and lined scene based on both the texture and the line.

Wherein, the image offset determination module 13 calculating, according to two adjacent image frames and the scene in which the flight device 100 is currently located, an image horizontal offset of a second image frame of the two adjacent image frames relative to a first image frame of the two adjacent image frames includes: the image offset determination module 13 choosing a corresponding algorithm according to the scene in which the flight device 100 is currently located; the image offset determination module 13 analyzing and processing the two adjacent image frames according to the algorithm so as to obtain the image horizontal offset of the second image frame of the two adjacent image frames relative to the first image frame of the two adjacent image frames.

Specifically, for the richly-textured scene, the image offset determination module 13 adopts the algorithm of gray template matching. Specifically, the image offset determination module 13 set the width and the height of the current image be W and H respectively, the size of a template image T be Mx×My, wherein Mx=W−8, My=H−8, and the template image T is obtained from the location of the current image frame [4, 4]; the image offset determination module 13 set the size of a matching image S is Nx×Ny, wherein Nx=W, Ny=H, and the matching image S is obtained from the previous frame image. During the matching, the template image is stacked on the matching image and translated. The searched sub-image in the reference image covered by the template image is S(i, j), wherein i, j is the location of the upper-left corner image point of the sub-image in the matching image S, and values of i and j are within the range [−4, 4]. S (0, 0) corresponding to the location [4, 4] of A. During the matching, to find a searched sub-image as similar as possible to the template image and the coordinate locations i and j thereof, the correlation function SAD is calculated. The location where the SAD value of T and S(i, j) is minimum is the best matching location, i.e., the relative offset or movement in the X direction and the Y direction of two adjacent image frames, i.e., the image X-offset and the image Y-offset of the two adjacent image frames. Wherein the offset is within the range [−4, 4]. SAD refers to the process of calculating the sum of absolute values of the differences between pixels corresponding to each location of the two images. The smaller the SAD value is, the higher the level of matching of the two images will be, and the location where the SAD value is the minimum can be used as the best matching.

For the poorly-textured scene, the image offset determination module 13 adopts the sobel gradient template matching algorithm. Specifically, the image offset determination module 13 performs edge detection through the Sobel algorithm which uses the two-dimensional template for calculation, wherein the two-dimensional template includes a horizontal template and a vertical template. As shown in the following figures, the horizontal template is used for difference operation in the horizontal direction, and the vertical template is used for difference operation in the vertical direction.

Horizontal Template:

| −1 | 0 | 1 |
|---|---|---|
| −2 | 0 | 2 |
| −1 | 0 | 1 |

Vertical Template:

| −1 | −2 | −1 |
|---|---|---|
| 0 | 0 | 0 |
| 1 | 2 | 1 |

The image offset determination module 13 uses the above templates to perform plane convolution operation so as to calculate the convolution fx in horizontal-direction and the convolution fy in vertical-direction, and to calculate the gradient value G, which is the square root of the sum of squares of fx and fy. Thereafter, the gradient operation is performed on the two adjacent images respectively to obtain the gradient matrix A and the gradient matrix B. Wherein A refers to the Sobel gradient matrix of the previous frame image, and B refers to the Sobel gradient matrix of the current frame image. The image offset determination module 13 Set the size of the template image T be Mx×My, wherein Mx=W−8, My=H−8, and the template image T is obtained from the location [4, 4] of B. The image offset determination module 13 set the size of the matching image S be Nx×Ny, wherein Nx=W, Ny=H, and the matching image S is obtained from A. During the matching, the template image is stacked on the matching image and translated. The searched sub-image in the reference image covered by the template image is S(i, j), wherein i, j is the location of the upper-left corner image point of the sub-image in the matching image 5, and values of i and j are within the range [−4, 4]. S (0, 0) corresponding to the location [4, 4] of A. Difference operation is performed on the gradient matrix T and S (i, j) to obtain a matrix difference matrix C. The sum of absolute values of each element in the matrix C that satisfies the following conditions (e.g., the following Condition 1 and Condition 2) is calculated to obtain the sum SS (i, j).

$$A[r,c]>T \quad \text{(Condition 1)}$$

$$B[r,c]>T \quad \text{(Condition 2)}$$

Wherein A[r, c] refers to the gradient value at the location r, c in the gradient matrix A, and B[r, c] refers to the gradient value at the location r, c in the gradient matrix B, wherein r>=0 and r<My, c>=0 and c<Mx, and T is gradient threshold. The location (i, j) where the value of SS(i, j) is minimum is the best matching location, i.e., relative offset or movement in the X direction and the Y direction of two adjacent image frames, i.e., the image X-offset and the image Y-offset of the two adjacent image frames. Wherein the offset is within the range [−4, 4].

When the scene in which the flight device 100 is currently located is an extremely bright scene or an extremely dark scene, the image offset determination module 13 performs histogram equalization on the image to make the brightness of the image uniform. Then, the image offset determination module 13 determines whether the scene is a richly-textured scene and chooses the corresponding algorithm to process the image depending on whether the scene is a richly-texture scene according to the aforesaid relationships.

When the scene in which the flight device 100 is currently located is a scene with reflection, the image offset determination module 13 removes the shadow in the image. After the shadow is removed, the image offset determination module 13 determines whether the scene is a richly-textured scene, and chooses the corresponding algorithm depending on whether the scene is a richly-texture scene according to the aforesaid relationships.

When the scene in which the flight device 100 is currently located is a richly-lined scene, the image offset determination module 13 divides the straight lines into straight lines in the horizontal direction and straight lines in the vertical direction. A straight line Lph is found from the previous frame image, wherein the angular difference between the straight line and a straight line Lch in the horizontal direction detected in the current image is the smallest. The distance between the two straight lines is calculated as j, and j is set to 0 if it is not within the range [−R, R], wherein R is a preset moving range, and generally R is set to 4. A straight line Lpv is found from the previous frame image, wherein the angular difference between the straight line Lpv and a straight line Lev in the vertical direction detected in the current image is the smallest. The distance between the two straight lines is calculated as i, and i is set to 0 if it is not within the range [−R, R]. i, j obtained through straight line positioning is the relative offset or movement of two adjacent images in the X direction and the Y direction, i.e., the image X-offset and the image Y-offset of the two adjacent image frames, and the offsets are within the range [−4, 4].

Accordingly, through the flight device 100 and the flight control system S1 of the present disclosure, the velocity detection and the positioning control can be performed on the flight device 100 when there is no GPS signal, and furthermore, accurate control can be achieved based on different scenes.

Figure 5:
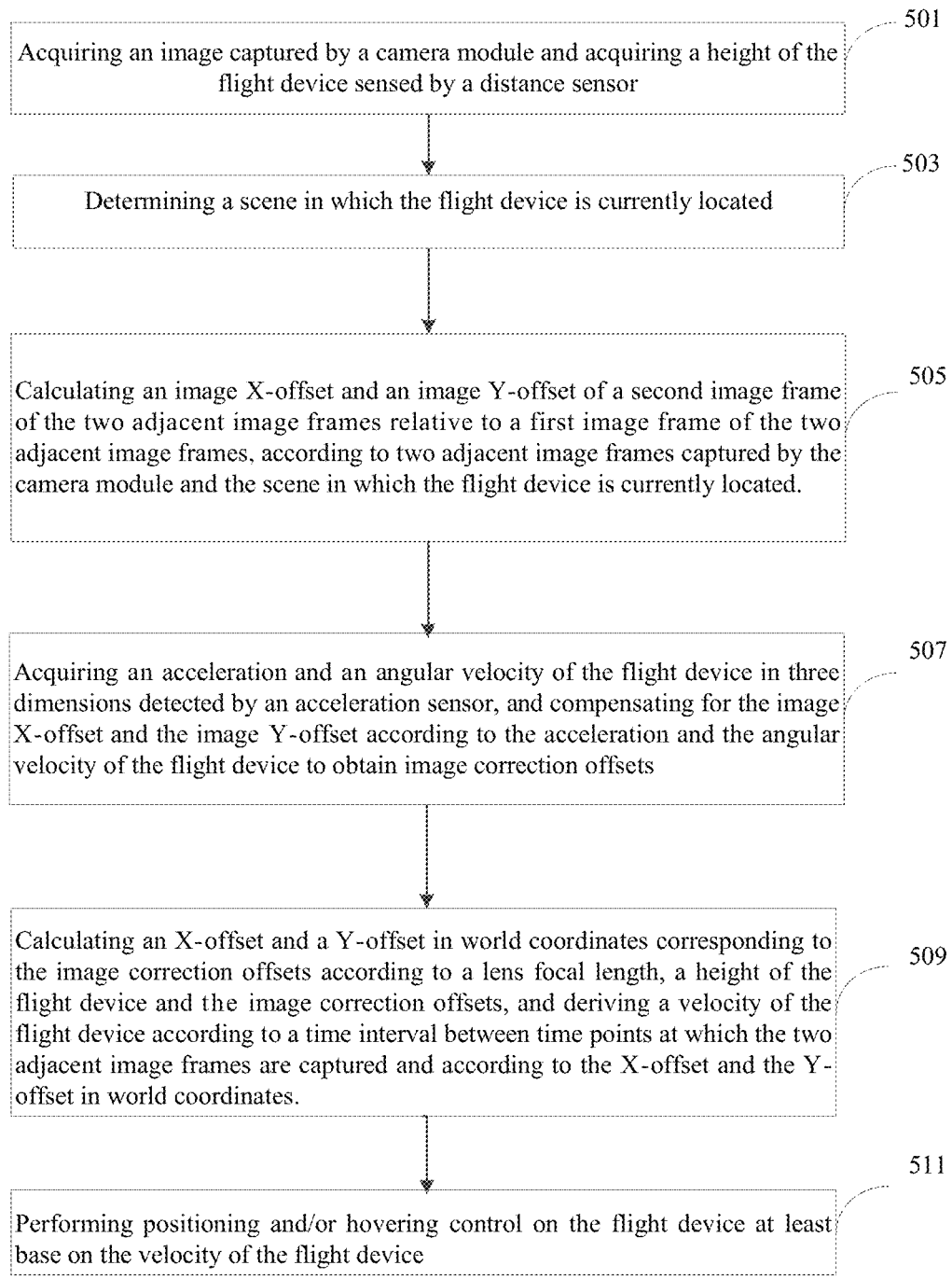
FIG. 5 is a flowchart diagram of a flight control method according to an embodiment of the present disclosure.

Referring to FIG. 5, there is shown a flowchart diagram of a flight control method according to an embodiment of the present disclosure. The flight control method is used to detect the velocity of the flight device 100 and perform positioning control on the flight device 100. The flight control method includes:

At block 501, the acquisition module 11 acquires an image captured by a camera module 20 and acquires a height of the flight device 100 sensed by the distance sensor 40.

At block 503, the scene determination module 12 determines a scene in which the flight device 100 is currently located.

At block 505, the image offset determination module 13 calculates, according to two adjacent image frames captured by the camera module 20 and a scene in which the flight device 100 is currently located, an image X-offset and an image Y-offset of a second image frame of the two adjacent image frames relative to a first image frame of the two adjacent image frames. Wherein the image offset determination module 13 determines a same feature point in the two adjacent image frames, and calculates the X-offset and the Y-offset of the same feature point in the two adjacent image frames to obtain the image X-offset and the image Y-offset. Wherein the scene determination module 12 determines the type of the scene according to at least one parameter in the image captured by the camera module 20; the scene determination module 12 chooses a corresponding algorithm according to the scene in which the flight device 100 is currently located, and analyzes and processes the two adjacent image frames according to the algorithm to obtain the image horizontal offset of the second image frame relative to the first image frame.

At block 507, the offset calibration module 14 acquires an acceleration and an angular velocity of the flight device 100 in three dimensions that are detected by the acceleration sensor 30, and compensates for the image X-offset and the image Y-offset according to the acceleration and the angular velocity of the flight device 100 to obtain image correction offsets.

At block 509, the velocity calculation module 15 calculates an X-offset and a Y-offset in world coordinates corresponding to the image correction offsets according to a lens focal length, a height of the flight device 100 and the image correction offsets, and derives a velocity of the flight device 100 according to a time interval between time points at which the two adjacent image frames are captured and according to the X-offset and the Y-offset in world coordinates. Specifically, the velocity calculation module 15 calculates a rate of the flight device 100 in the X direction and a rate of the flight device 100 in the Y direction according to the time interval t1 and according to the X-offset and the Y-offset in world coordinates. More specifically, the velocity calculation module 15 derives the rate of the flight device 100 in the X direction and the rate of the flight device 100 in the Y direction by respectively dividing the X-offset and the Y-offset by the time interval.

At block 511, the running controlling module 16 performs positioning and/or hovering control on the flight device 100 at least based on the velocity of the flight device 100.

What described above are only the exemplary embodiments of the present disclosure, but are not intended to limit the scope of the present disclosure. Any modifications, equivalent replacements and improvements that are made within the spirit and the principle of the present disclosure shall all be covered within the scope of the present disclosure.

What is claimed is:

1. A flight device, comprising
a processor; and
a memory communicatively connected with the processor, the memory storing instructions, wherein when executing the instructions, the processor is configured to:
acquire an image captured by a camera module of the flight device;
acquire a height of the flight device sensed by a distance sensor of the flight device;
determine a scene in which the flight device is located according to at least one parameter of the image captured by the camera module;
analyze changes in the parameters of the two adjacent image frames according to an algorithm corresponding to the scene in which the flight device is located so as to calculate an image X-offset and an image Y-offset of a second image frame of the two adjacent image frames relative to a first image frame of the two adjacent image frames;
acquire acceleration and angular velocity of the flight device in three dimensions that are detected by an acceleration sensor of the flight device;
compensate for the image X-offset and the image Y-offset according to the acceleration and the angular velocity of the flight device to obtain image correction offsets comprising a corrected image X-offset and a corrected image Y-offset;
calculate an X-offset and a Y-offset in world coordinates corresponding to the image correction offsets according to a lens focal length of the camera module, a height of the flight device and the image correction offsets; and
derive a velocity of the flight device according to a time interval between time points at which the two adjacent image frames are captured and according to the X-offset and the Y-offset in world coordinates;
wherein the at least one parameter comprises texture, and the processor is further configured to:
process the image by use of the sobel gradient algorithm to obtain a gradient matrix;
count the number of pixels of which the gradient is greater than a predetermined first threshold in the gradient matrix;
determine that the current scene is a richly textured scene if the number as counted is greater than a second threshold;
determine that the texture is relatively poor and that the current scene is a relatively poorly textured scene if the number as counted is smaller than or equal to the second threshold;
adopt the algorithm of gray template matching when the current scene is a richly textured scene, to analyze changes in the parameters of the two adjacent image frames, so as to calculate the image X-offset and the image Y-offset of the second image frame of the two adjacent image frames relative to the first image frame of the two adjacent image frames; and
adopt the algorithm of sobel gradient template matching when the current scene is a relative poorly textured scene, to analyze changes in the parameters of the two adjacent image frames, so as to calculate the image X-offset and the image Y-offset of the second image frame of the two adjacent image frames relative to the first image frame of the two adjacent image frames.

2. The flight device according to claim 1, wherein the processor is further configured to:
perform positioning and/or hovering control on the flight device at least based on the velocity of the flight device.

3. The flight device according to claim 1, wherein the processor is further configured to:
set the width and the height of the current image be W and H respectively;
set the size of a template image T be Mx×My, wherein Mx=W−8, My=H−8, and the template image T is obtained from the location of the current frame image [4, 4];
set the size of a matching image S be Nx×Ny, wherein Nx=W, Ny=H, and the matching image S is obtained from the previous frame image;
during the matching, stack the template image on the matching image and translate the template image, wherein the searched sub-image in the reference image covered by the template image is S(i, j), wherein i, j is the locations of the upper-left corner image point of the sub-image in the matching image S, values of i and j are within the range [−4, 4], and S (0, 0) corresponding to the location [4, 4] of A; and
during the matching, to find a searched sub-image as similar as possible to the template image and the coordinate locations i and j thereof, calculate the correlation function SAD, wherein the location where the SAD value of T and S(i, j) is minimum is the image X-offset and the image Y-offset of the two adjacent image frames and wherein SAD refers to the process of calculating the sum of absolute values of the differences between pixels corresponding to each location of the two images.

4. The flight device according to claim 1, wherein the processor is further configured to:
perform edge detection through Sobel algorithm and calculate by use of a two-dimensional template, wherein the two-dimensional template comprises a horizontal template used for difference operation in the horizontal direction and a vertical template used for difference operation in the vertical direction;
use the horizontal and vertical templates to perform plane convolution operation so as to calculate the convolution fx in horizontal-direction and the convolution fy in vertical-direction respectively and calculate the gradient value G, which is the square root of the sum of squares of fx and fy, and then perform the gradient operation on the two adjacent images respectively to obtain the gradient matrix A and the gradient matrix B, wherein A is the Sobel gradient matrix of the previous frame image, and B is the Sobel gradient matrix of the current frame image;

set the size of the template image T be Mx×My, wherein Mx=W−8, My=H−8, and the template image T is obtained from the location [4, 4] of B;

set the size of the matching image S be Nx×Ny, wherein Nx=W, Ny=H, and the matching image S is obtained from A;

during the matching, stack the template image on the matching image and translate the template image, wherein the searched sub-image in the reference image covered by the template image is S(i, j), wherein i, j is the location of the upper-left corner image point of the sub-image in the matching image S, values of i and j are within the range [−4, 4], and S (0, 0) corresponding to the location [4, 4] of A;

perform difference operation on the gradient matrix T and S (i, j) to obtain a difference matrix C; and calculate the sum of absolute values of each element in the matrix C that satisfies Conditions 1 and 2 to obtain the sum SS (i, j), wherein Condition 1 is A[r, c]>T and Condition 2 is B[r, c]>T;

wherein A[r, c] is the gradient value at the location r, c in the gradient matrix A, and B[r, c] is the gradient value at the location r, c in the gradient matrix B, wherein r>=0 and r<My, c>=0 and c<Mx, and T is gradient threshold, and wherein the location (i, j) where the value of SS(i, j) is minimum is the image X-offset and the image Y-offset of the two adjacent image frames.

5. The flight device according to claim 1, wherein the processor is further configured to:

calculate the X-offset in world coordinates according to Formula 1: x1/X1=f/H, and calculates the Y-offset in world coordinates according to Formula 2: y1/Y1=f/H, wherein x1 is a corrected image X-offset, y1 is a corrected image Y-offset, f is lens focal length, H is height of the flight device, X1 is the X-offset in world coordinates, and Y1 is the Y-offset in world coordinates; and calculate a rate of the flight device in the X direction and a rate of the flight device in the Y direction according to the time interval between time points at which the two adjacent image frames are captured by the camera module and according to the X-offset and the Y-offset in world coordinates.

6. A flight device, comprising:

a processor; and a memory communicably connected with the processor, the memory storing instructions, wherein when executing the instructions, the processor is configured to:

acquire an image captured by a camera module of the flight device;

acquire a height of the flight device sensed by a distance sensor of the flight device;

determine a scene in which the flight device is located according to at least one parameter of the image captured by the camera module;

analyze changes in the parameters of the two adjacent image frames according to the algorithm corresponding to the scene in which the flight device is located so as to calculate an image X-offset and an image Y-offset of a second image frame of the two adjacent image frames relative to a first image frame of the two adjacent image frames;

acquire acceleration and angular velocity of the flight device in three dimensions that are detected by an acceleration sensor of the flight device;

compensate for the image X-offset and the image Y-offset according to the acceleration and the angular velocity of the flight device to obtain image correction offsets comprising a corrected image X-offset and a corrected image Y-offset;

calculate an X-offset and a Y-offset in world coordinates corresponding to the image correction offsets according to a lens focal length of the camera module, a height of the flight device and the image correction offsets; and derive a velocity of the flight device according to a time interval between time points at which the two adjacent image frames are captured and according to the X-offset and the Y-offset in world coordinates;

wherein the at least one parameter further comprises reflections, and the processor is further configured to:

perform shadow statistics according to continuous multi-frame images;

determine whether there are reflections so as to determine whether the scene is a scene with reflections or a scene without reflections;

when the scene in which the flight device is currently located is a scene with reflection:

remove the shadows in the image;

after the shadows are removed, determine whether the scene is a richly-textured scene;

adopt the algorithm of gray template matching when the current scene is a richly textured scene, to analyze changes in the parameters of the two adjacent image frames, so as to calculate the image X-offset and the image Y-offset of the second image frame of the two adjacent image frames relative to the first image frame of the two adjacent image frames; and adopt the algorithm of sobel gradient template matching when the current scene is a relative poorly textured scene, to analyze changes in the parameters of the two adjacent image frames, so as to calculate the image X-offset and the image Y-offset of the second image frame of the two adjacent image frames relative to the first image frame of the two adjacent image frames.

7. A flight device, comprising:

a processor; and a memory communicably connected with the processor, the memory storing instructions, wherein when executing the instructions, the processor is configured to:

acquire an image captured by a camera module of the flight device;

acquire a height of the flight device sensed by a distance sensor of the flight device;

determine a scene in which the flight device is located according to at least one parameter of the image captured by the camera module;

analyze changes in the parameters of the two adjacent image frames according to the algorithm corresponding to the scene in which the flight device is located so as to calculate an image X-offset and an image Y-offset of a second image frame of the two adjacent image frames relative to a first image frame of the two adjacent image frames;

acquire acceleration and angular velocity of the flight device in three dimensions that are detected by an acceleration sensor of the flight device;

compensate for the image X-offset and the image Y-offset according to the acceleration and the angular velocity of the flight device to obtain image correction offsets comprising a corrected image X-offset and a corrected image Y-offset;

calculate an X-offset and a Y-offset in world coordinates corresponding to the image correction offsets according to a lens focal length of the camera module, a height of the flight device and the image correction offsets; and derive a velocity of the flight device according to a time interval between time points at which the two adjacent image frames are captured and according to the X-offset and the Y-offset in world coordinates;

wherein the at least one parameter further comprises grayscale, and the processor is further configured to:

convert the image into a gray scale histogram according to the gray scale value of the image;

performs statistics to get a statistical value;

compare the statistical value with corresponding threshold, thereby determine whether the scene is a dark, normal, or bright scene;

when the scene in which the flight device is currently located is a bright or a dark scene:

perform histogram equalization on the image to make the brightness of the image uniform;

determine whether the scene is a richly-textured scene;

adopts the algorithm of gray template matching when the current scene is a richly textured scene, to analyze changes in the parameters of the two adjacent image frames, so as to calculate the image X-offset and the image Y-offset of the second image frame of the two adjacent image frames relative to the first image frame of the two adjacent image frames; and adopt the algorithm of sobel gradient template matching when the current scene is a relative poorly textured scene, to analyze changes in the parameters of the two adjacent image frames, so as to calculate the image X-offset and the image Y-offset of the second image frame of the two adjacent image frames relative to the first image frame of the two adjacent image frames.

8. A flight device, comprising:

a processor; and a memory communicably connected with the processor, the memory storing instructions, wherein when executing the instructions, the processor is configured to:

acquire an image captured by a camera module of the flight device;

acquire a height of the flight device sensed by a distance sensor of the flight device;

determine a scene in which the flight device is located according to at least one parameter of the image captured by the camera module;

analyze changes in the parameters of the two adjacent image frames according to the algorithm corresponding to the scene in which the flight device is located so as to calculate an image X-offset and an image Y-offset of a second image frame of the two adjacent image frames relative to a first image frame of the two adjacent image frames;

acquire acceleration and angular velocity of the flight device in three dimensions that are detected by an acceleration sensor of the flight device;

compensate for the image X-offset and the image Y-offset according to the acceleration and the angular velocity of the flight device to obtain image correction offsets comprising a corrected image X-offset and a corrected image Y-offset;

calculate an X-offset and a Y-offset in world coordinates corresponding to the image correction offsets according to a lens focal length of the camera module, a height of the flight device and the image correction offsets; and derive a velocity of the flight device according to a time interval between time points at which the two adjacent image frames are captured and according to the X-offset and the Y-offset in world coordinates;

wherein the at least one parameter further comprises lines, and the processor is further configured to:

perform gradient detection on the image;

perform binary processing on the image;

use the hough straight-line detection, to determine whether there are straight lines;

if it is determined that there is at least one straight line and the length of the straight line is at least ½ of the width of the image, the scene is determined as a richly-lined scene;

when the scene in which the flight device is currently located is a richly-lined scene:

divide the straight lines into straight lines in the horizontal direction and straight lines in the vertical direction;

find a straight line from the previous frame image, wherein the angular difference between the straight lien and a straight line in the horizontal direction detected in the current image is the smallest, calculate the distance between these two straight lines to get a first distance and set the first distance to 0 if the first distance is not within the range [−R, R], wherein R is a set moving range; and find a straight line from the previous frame image, wherein the angular difference between the straight line and a straight line in the vertical direction detected in the current image is the smallest, calculate the distance between these two straight lines to get a second distance and set the second distance to 0 if the second distance is not within the range [−R, R]; and thus the first distance and the second distance obtained through straight line positioning are the image X-offset and the image Y-offset of the two adjacent image frames.

* * * * *